(12) United States Patent  
Watanabe et al.

(10) Patent No.: US 8,216,018 B2  
(45) Date of Patent: Jul. 10, 2012

(54) DISPLAY MANUFACTURING METHOD

(75) Inventors: Naoki Watanabe, Tokyo (JP); Kazuhiko Kaida, Numazu (JP); Toshimitsu Tanaka, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 12/984,536

(22) Filed: Jan. 4, 2011

(65) Prior Publication Data

US 2011/0165817 A1 Jul. 7, 2011

(30) Foreign Application Priority Data

Jan. 7, 2010 (JP) .................................. 2010-001709

(51) Int. Cl.
*H01J 9/26* (2006.01)

(52) U.S. Cl. ............................ 445/25; 445/24; 349/190
(58) Field of Classification Search .............. 445/24–25; 349/190

See application file for complete search history.

(56) References Cited

U.S. PATENT DOCUMENTS 5,854,664 A * 12/1998 Inoue et al. ..................... 349/92

FOREIGN PATENT DOCUMENTS

JP 2000-053453 A 2/2000

* cited by examiner

*Primary Examiner* — Anne Hines
(74) *Attorney, Agent, or Firm* — Canon USA, Inc. IP Division

(57) ABSTRACT

A method for manufacturing a display, where the display includes a light-transmissive substrate adhering to a display substrate that forms a display surface side of a display body. An edge of at least either an adhesion surface of the display substrate or an adhesion surface of the light-transmissive substrate is coated with an adhesive. The display substrate and the light-transmissive substrate are positioned in an offset manner to provide overlapping and non overlapping regions. For example, an edge of each of two adhesion surfaces overlap with each other, and other regions do not overlap with each other. The display substrate and the light-transmissive substrate are relatively moved to a position where an edge of the display substrate and an edge of the light-transmissive substrate respectively overlap with other edges in a state in which adhesive reservoirs are formed while maintaining a fixed gap between the two adhesion surfaces.

4 Claims, 5 Drawing Sheets

DISPLAY MANUFACTURING METHOD

BACKGROUND OF THE INVENTION

1. Field of the Invention

The present invention relates to a method for manufacturing a display having a light-transmissive substrate for improving, for example, shock resistance and display performance, attached to an outer surface of a display substrate forming a display surface of a display body.

2. Description of the Related Art

Conventionally, a method discussed in Japanese Patent Application Laid-Open No. 2000-053453 has been known as a method for attaching a light-transmissive substrate (thin sheet of glass) to an outer surface of a display surface of a display body for improving shock resistance and display performance. In this method, an adhesive is coated on either the display face of the display body or on the light-transmissive substrate, and the light-transmissive substrate, which is curved so as to protrude out towards the display surface of the display body, is gradually attached while pressing it from one side toward the opposing side with a roller.

However, since the method discussed in Japanese Patent Application Laid-Open No. 2000-053453 presses the surface of the light-transmissive substrate with a roller toward the display surface of the display body, this method has the problem that a load tends to be applied on the display surface. The load applied on the display surface of the display body produces deformation in the plate member forming the display surface, which can damage the plate itself as well as the inner parts. Further, there is also the problem that the light-transmissive substrate can easily be damaged by the bending and the load applied by the roller.

SUMMARY OF THE INVENTION

The present invention is directed to providing a method for manufacturing a display, which includes the process of enabling a light-transmissive substrate to be adhered to a display surface of a display body, by applying almost no load on the display surface or the light-transmissive substrate.

An embodiment includes a method for manufacturing a display, where the display includes a light-transmissive substrate adhering to a display substrate that forms a display surface side of a display body. An edge of at least either an adhesion surface of the display substrate or an adhesion surface of the light-transmissive substrate is coated with an adhesive. The display substrate and the light-transmissive substrate are positioned in an offset manner to provide overlapping and non overlapping regions. For example, an edge of each of two adhesion surfaces overlap with each other via the adhesive, and other regions of the two adhesion surfaces do not overlap with each other in an opposing direction. The display substrate and the light-transmissive substrate are relatively moved to a position where an edge of the display substrate and an edge of the light-transmissive substrate respectively overlap with other edges. For example, the display substrate and the light-transmissive substrate are relatively moved to a position where an edge of the display substrate and an edge of the light-transmissive substrate respectively overlap with another edge of the light-transmissive substrate and another edge of the display substrate. This is done in a state in which an adhesive reservoir is formed along entire lengths of a corner portion formed by a side edge face on an edge side of the display substrate overlapping with the light-transmissive substrate and the adhesion surface of the light-transmissive substrate, and a corner portion formed by a side edge face on an edge side of the light-transmissive substrate overlapping with the display substrate, and the adhesion surface of the display substrate, respectively, while maintaining a fixed gap between the two adhesion surfaces.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

In the display manufacturing method, only one edge on each adhesion surface of the display substrate and the light-transmissive substrate are made to overlap with each other via the adhesive, and then the substrates are attached to each other by moving the display substrate and the light-transmissive substrate relative to each other along the two adhesion faces. This relative movement is performed in a state in which an adhesive reservoir is formed between the two adhesion surfaces at a position where the adhesive has been drawn in. More specifically, adhesion is performed in a state in which an adhesive reservoir is formed along the entire length of a corner portion formed by a side edge face on an edge side of the display substrate and the adhesion surface of the light-transmissive substrate, and a corner portion formed by a side edge face on an edge side of the light-transmissive substrate and the adhesion surface of the display substrate. Due to the presence of these adhesive reservoirs, adhesion can be performed by drawing only adhesive in, while preventing air from entering between the adhesion surfaces of the display substrate and the light-transmissive substrate, which goes without bending or applying pressure as in the conventional art.

Thus, since the process of attaching the display substrate and the light-transmissive substrate can be performed without bending the light-transmissive substrate or pressing on the display surface, an excessive load is not applied during this process on the display surface or the light-transmissive substrate. Therefore, a display having a light-transmissive substrate can be easily manufactured without affecting display performance, even for a large screen flat panel display.

Further, although the embodiments are suited to the manufacture of a flat panel display, such as an electron beam display panel, a liquid crystal display panel, an electroluminescent (EL) display panel, and a plasma display panel, the embodiments can also be used in the manufacture of a cathode ray tube (CRT) display.

Various exemplary embodiments, features, and aspects of the invention will be described in detail below with reference to the drawings.

In the exemplary embodiments, the adhesive reservoirs formed in the corner portions are adhesive that is at least thicker than the adhesive sandwiched between the adhesion surfaces of the display substrate and the light-transmissive substrate, and which closely adheres to and rises on the two faces forming the corner portion. The two faces forming the corner portion are a side edge face on an edge of the display substrate and the adhesion surface of the light-transmissive substrate, or a side edge face on an edge side of the light-transmissive substrate and the adhesion surface of the display substrate. The term "display body" refers to a panel portion forming the screen on a flat panel display, or the CRT portion on a CRT display.

Figure 1A:
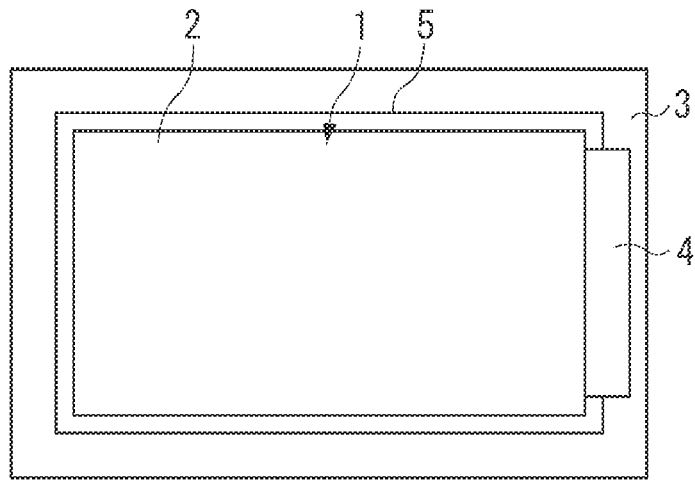
FIGS. 1A, 1B, 1C, and 1D schematically illustrate a state in which a display body is set on a pasting base, and a state in which a light-transmissive substrate is set on a holding unit.
Figure 1B:
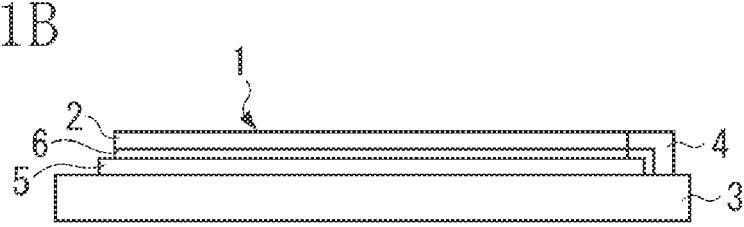
Figure 1C:
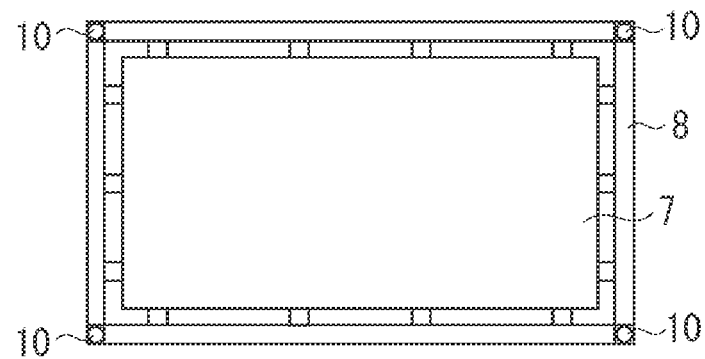
Figure 1D:
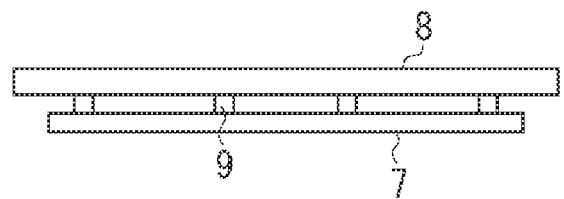

FIG. 1A is a planar view of a display body set on a pasting base. FIG. 1B is a side view of a display body set on a pasting base. FIG. 1C is a bottom view of a light-transmissive substrate set on holding unit. FIG. 1D is a side view of a light-transmissive substrate set on holding unit.

In FIGS. 1A and 1B, a display body 1 is set on a pasting base 3, with a display substrate 2 forming a display surface facing upwards. On an edge of the pasting base 3, a reverse L-shaped abutting member 4 is provided. The display body 1 is positioned so that a side edge face on one side of the display substrate 2, which forms a square plane, abuts the abutting member 4. Further, the display body 1 has a back substrate 5 and a frame 6 that is formed between the display substrate 2 and the back substrate 5. In FIGS. 1C and 1D, a light-transmissive substrate 7 is attached with its adhesion surface facing downwards by a vacuum attachment member 9 provided on a holding unit 8. Further, a laser displacement sensor 10 is provided at the four corners of the holding unit 8.

Figure 2A:
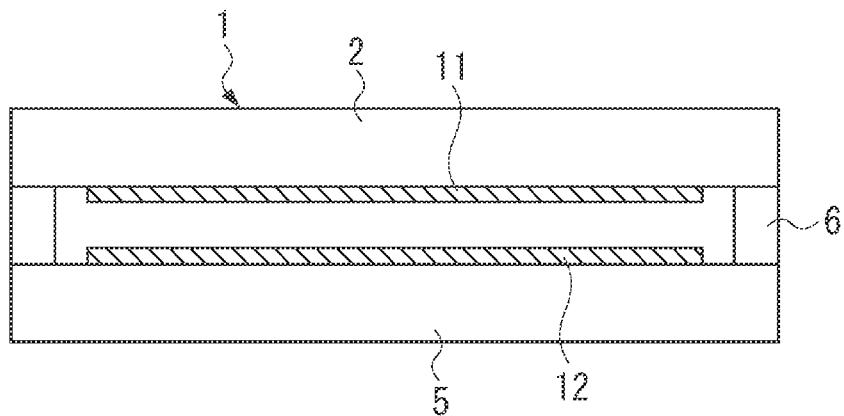
FIGS. 2A, 2B, 2C, and 2D are schematic, cross-sectional diagrams illustrating a display body and a light-transmissive substrate.

As illustrated in FIG. 2A, the display body 1 includes the display substrate 2 which forms the display surface side, the back substrate 5 which forms the back face side, and the frame 6 which forms a hermetic container along with the display substrate 2 and the back substrate 5. An image display unit is arranged in this hermetic container. Using an example of an electron beam display panel, the image display unit includes a phosphor 11 arranged on the display substrate 2 side and an electron source 12 arranged on the back substrate 5 side. Further, although not illustrated, if the image display unit is a liquid crystal display panel, it includes liquid crystals, transistors, and electrodes. If this image display unit is an EL display panel, it includes an EL element, and if the image display unit is a plasma display panel, it includes a phosphor, a plasma generating gas, and electrodes.

Figure 2B:
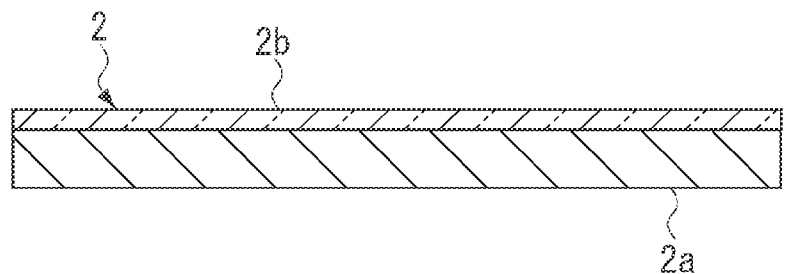
Figure 2C:
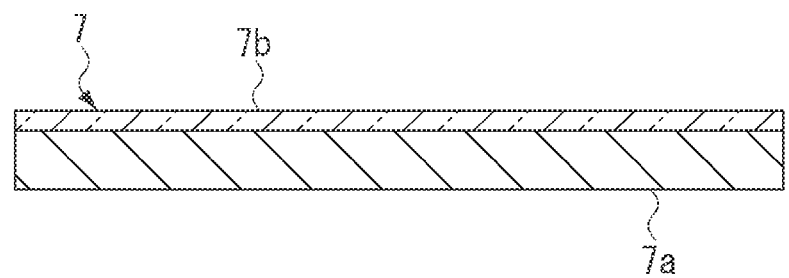
Figure 2D:
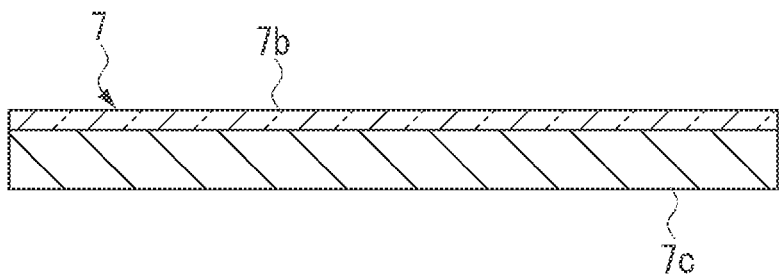

As illustrated in FIG. 2B, the display substrate 2 forming the display surface side of the display body 1 may be formed from a transparent glass 2a and a light-transmissive resin film 2b pasted on a surface thereof, or just from the transparent glass 2a. The light-transmissive resin film 2b is a resin film that, for example, includes functions such as charge suppression, light reflection suppression, and color filtering. An example of the light-transmissive substrate 7 adhering to the outer surface of the display surface of the display body 1 is illustrated in FIGS. 2C and 2D. As illustrated in the drawings, the light-transmissive substrate 7 may be formed from a transparent glass 7a or transparent resin substrate 7c and a light-transmissive resin film 7b pasted on the surface thereof, or from just the transparent glass 7a or transparent resin substrate 7c. Similar to the light-transmissive resin film 2b, the light-transmissive resin film 7b is a resin film that, for example, includes functions such as charge suppression, light reflection suppression, and color filtering. If the light-transmissive resin film 2b is provided on the display substrate 2 of the display body 1, usually a film having a different function from the light-transmissive resin film 2b will be used for the light-transmissive resin film 7b. However, a film having the same function may also be used. From the perspective of improving the shock resistance of the display body 1, it is preferred that the light-transmissive substrate 7 is formed from the transparent glass 7a or transparent resin substrate 7c and the light-transmissive resin film 7b pasted on the surface thereof.

Next, the process for pasting the light-transmissive substrate 7 onto the display body 1 will be described based on FIGS. 3A, 3B, and FIGS. 4A, 4B, 4C, and 4D.

Figure 3A:
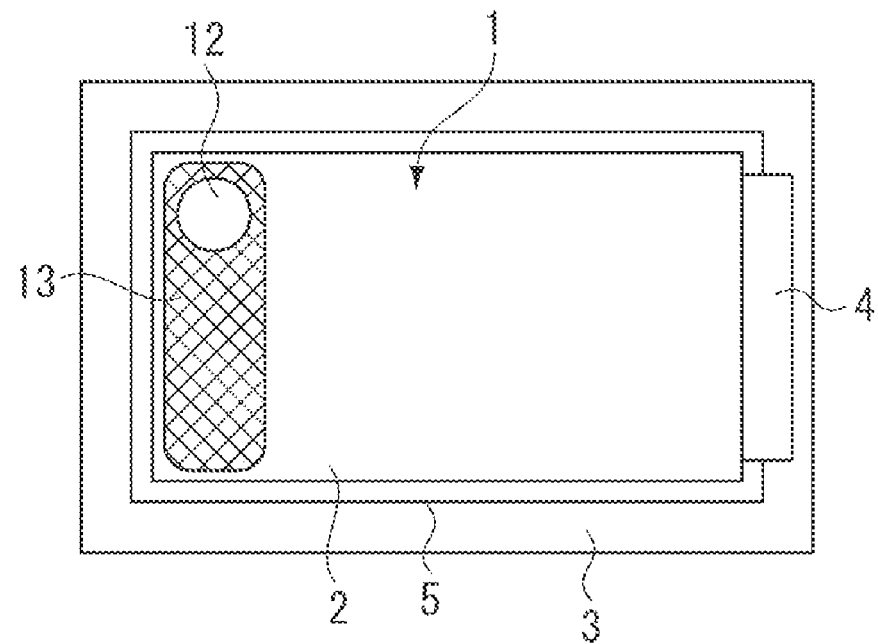
FIGS. 3A and 3B schematically illustrate an example of coating process.
Figure 3B:
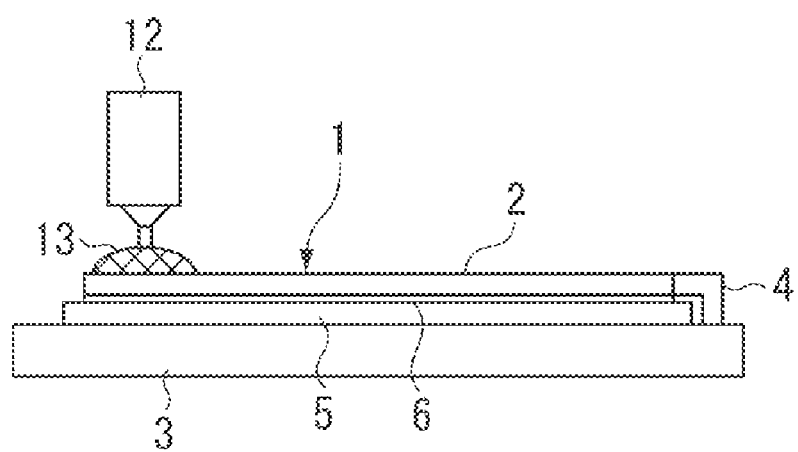

First, before or after the display body 1 is set on the pasting base 3 described in FIGS. 1A, 1B, 1C, and 1D, a pretreatment is performed, in which the adhesion surface of the display substrate 2 forming the display surface of the display body 1 is washed with an organic solvent such as acetone. Then, as illustrated in FIGS. 3A and 3B, a first process is performed. In this first process, an adhesive 13 is coated along an edge on the adhesion surface of the display substrate 2. The adhesive 13 is not especially limited, as long as it is a transparent adhesive that does not affect the display. Adhesives such as a thermosetting adhesive, a cold-setting adhesive, a two-pack adhesive, and a UV-curable adhesive may be used as necessary. A viscosity of the adhesive 13 is preferably selected from the range of 0.1 Pa·s to 10 Pa·s at 25° C. It is preferred to use a UV-curable adhesive, based on the fact that a heat load is not applied on the display body 1, and tact can be reduced. Concerning the coating of the adhesive 13, first, it is preferred to place the adhesive 13 in a syringe, and carry out a defoaming treatment in advance. The defoaming treatment can be performed by a centrifugal separation method or by a vacuum defoaming method. This defoaming treatment may be omitted if the amount of air mixed in the adhesive 13 is sufficiently low. After performing the optional defoaming treatment, the syringe is mounted on a pressure dispenser (fluid quantification discharge apparatus) 12, and the adhesive 13 is coated on the adhesion surface of the display substrate 2. As illustrated in FIG. 3A, the coating is performed along roughly the entire length of an edge on the adhesion face of the display substrate 2, and preferably along roughly the entire length of an edge on one of the short sides.

Figure 4A:
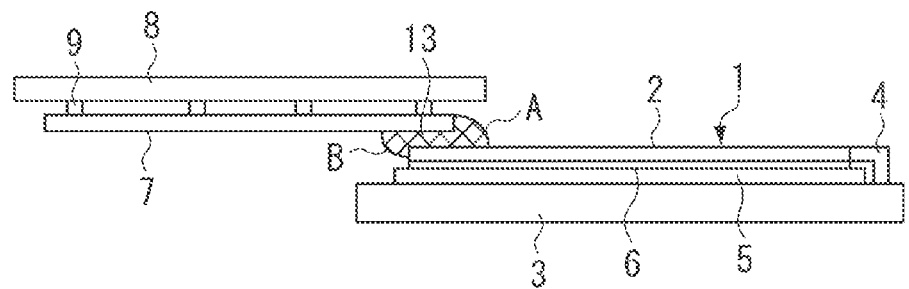
FIGS. 4A, 4B, 4C, and 4D schematically illustrate an example of a positioning process and a moving process.

Next, as illustrated in FIG. 4A, a second process is performed. In the second process, the light-transmissive substrate 7 adsorbed to the holding unit 8 facing downwards is moved to above the display body 1 which is held on the pasting base 3. The adhesion surface of the display substrate 2 of the display body 1 and the adhesion surface of the light-transmissive substrate 7 are made parallel. Further, the position of the two adhesion surfaces (the position of the display substrate 2 and the position of the light-transmissive substrate 7) is positioned so that an edge on the adhesion surface of the display substrate 2 on which the adhesive 13 is coated and an edge on the adhesion surface of the light-transmissive substrate 7 overlap with each other in an opposing direction, and so that the other regions of the two adhesion surfaces do not overlap with each other in an opposing direction. Specifically, the position of the display body 1 (the display substrate 2) and the position of the light-transmissive substrate 7 are offset so that regions other that the above-described edges on the two adhesion surfaces do not overlap in an opposing direction. Then, the light-transmissive substrate 7 is lowered, and the edge on the adhesion surface of the light-transmissive substrate 7 is made to overlap with the edge on the adhesion surface of the display substrate 2, on which the adhesive 13 is coated, via the adhesive 13 with a predetermined gap therebetween. The gap between the adhesion surface of the display substrate 2 and the adhesion surface of the light-transmissive substrate 7 is defined by the distance between the two adhesion surfaces as detected by the laser displacement sensors 10 illustrated in FIG. 1C arranged at the four corners of the holding unit 8. When the edge on the adhesion surface of the light-transmissive substrate 7 overlaps with the edge on the adhesion surface of the display substrate 2, on which the adhesive 13 is coated, via the adhesive 13 with the predetermined gap therebetween, the already coated adhesive 13 is sandwiched between the two adhesion surfaces and spreads out. The spread-out adhesive 13 protrudes from between the two adhesion surfaces, and forms an adhesive reservoir A on a corner portion formed by a side edge face on an edge side of the display substrate 2, which overlaps with the light-transmissive substrate 7, and the adhesion surface of the light-transmissive substrate 7. An adhesive reservoir B is simultaneously formed on a corner portion formed by a side edge face on an edge side of the light-transmissive substrate 7, which overlaps with the display substrate 2, and the adhesion surface of the display substrate 2.

Figure 4B:
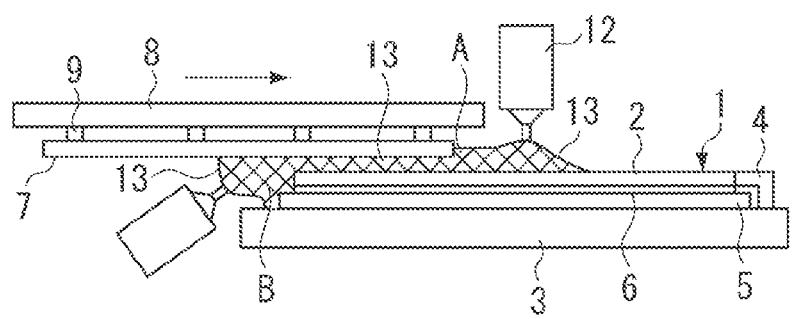
Figure 4C:
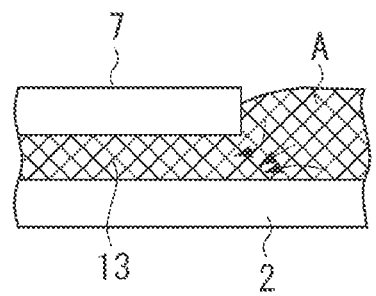

Next, as illustrated in FIG. 4B, a third process is performed. In this third process, the light-transmissive substrate 7 is slid while maintaining the gap between the adhesion surface of the display substrate 2 of the display body 1 and the adhesion surface of the light-transmissive substrate 7. This sliding movement is performed until the edge of the display substrate 2 and the edge of the light-transmissive substrate 7 respectively overlap with the other edge of the light-transmissive substrate 7 and the other edge of the display substrate 2. Specifically, this sliding movement is performed until a predetermined entire adhesion surface of the display substrate 2 and of the light-transmissive substrate 7 overlap with each other. The behavior of the adhesive 13 during the sliding movement is illustrated in the partial enlarged view of FIG. 4C. In FIG. 4C, in conjunction with the sliding movement, the adhesive 13 is sucked from the adhesive reservoir A and flows between the display substrate 2 and the light-transmissive substrate 7, as illustrated by the arrow. Similarly, from the adhesive reservoir B too, the adhesive 13 is sucked and flows between the display substrate 2 and the light-transmissive substrate 7. If the adhesive reservoirs A and B are formed along the entire length of the respective corner portions until the sliding movement of the light-transmissive substrate 7 is completed, the occurrence of air bubbles due to air being sucked in between the display substrate 2 and the light-transmissive substrate 7 can be prevented. Stated another way, if the adhesive reservoirs A and B can be maintained until the sliding movement of the light-transmissive substrate 7 is completed along the entire length of the respective corner portions, the occurrence of air bubbles due to air being sucked in between the display substrate 2 and the light-transmissive substrate 7 can be prevented. The adhesive reservoirs A and B can be maintained by additionally supplying the adhesive 13 as necessary. In the present example, a dispenser 12 is arranged on the edge face side of the display substrate 2 in contact with the adhesive reservoir A and near the external side on the edge side of the light-transmissive substrate 7 in contact with the adhesive reservoir B. By continuing to supply the adhesive 13 directly to the adhesive reservoirs A and B, the adhesive reservoirs A and B are formed constantly. While the light-transmissive substrate 7 is being slid, it is preferred that inclination control can be performed in the order of μm by the holding unit 8. Such control allows the adhesive 13 to be sandwiched and filled in a uniform thickness.

Figure 4D:
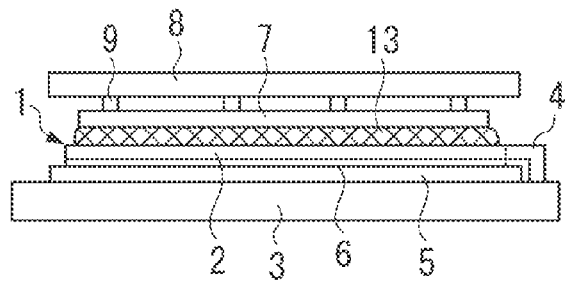

Finally, as illustrated in FIG. 4D, the pasting of the light-transmissive substrate 7 onto the above-described of the display body 1 is completed when the light-transmissive substrate 7 has moved to a position where the entire face of the predetermined adhesion surface of the display substrate 2 and of the light-transmissive substrate 7 overlap with each other. Subsequently, portions of the adhesive 13 protruding from between the display substrate 2 and the light-transmissive substrate 7 that do not need to be cured are wiped off as necessary, and the adhesive 13 is cured. In the present exemplary embodiment, since the abutting member 4 is provided on the pasting base 3, the display body 1 can be prevented from moving with the light-transmissive substrate 7 by the viscous drag of the adhesive 13 when the light-transmissive substrate 7 is moved. It is preferred to set the conditions of the pasting process by determining suitable and preferred conditions based on the strength of the member to be pasted, in consideration of the reaction force produced by viscous drag based on the pasted surface area, the required tact, the adhesive viscosity, and the adhesive wettability.

In the above description, the display body 1 arranged on the pasting base 3 was made to face downwards, and the light-transmissive substrate 7 held on the holding unit 8 was made to face upwards. However, this relationship may be reversed. Alternatively, the display body 1 and the light-transmissive substrate 7 may stand vertically upright or at an incline. However, considering the flow of the adhesive 13, it is preferred to carry out each of the processes while the display body 1 and the light-transmissive substrate 7 are kept horizontal and positioned one above the other with their adhesion surfaces parallel to each other. From the perspective of ease of attachment and holding, it is preferred to arrange the light-transmissive substrate 7 on the upper side. Further, in the above example, although the light-transmissive substrate 7 side was moved, the movement in the second and third processes may be performed by moving the display substrate 2 and the light-transmissive substrate 7 relative to each other. Therefore, the display substrate 2 (display body 1) may be moved, or both the display substrate 2 and the light-transmissive substrate 7 may be moved simultaneously. In addition, although the first process was described by coating the adhesive 13 on an edge of the display substrate 2 of the display body 1, the adhesive 13 may be coated on an edge of the light-transmissive substrate 7, or on an edge of both the display substrate 2 and the light-transmissive substrate 7. Especially, when the display substrate 2 and the light-transmissive substrate 7 are made to face each other and are positioned one above the other, it is preferred to perform the coating on the substrate arranged on the lower side because the adhesive 13 does not drip as easily.

Figure 5A:
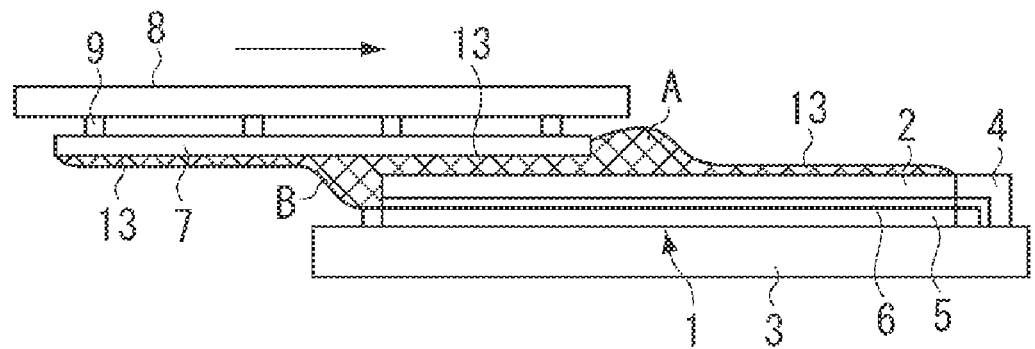
FIGS. 5A and 5B schematically illustrate another example of the moving process.
Figure 5B:
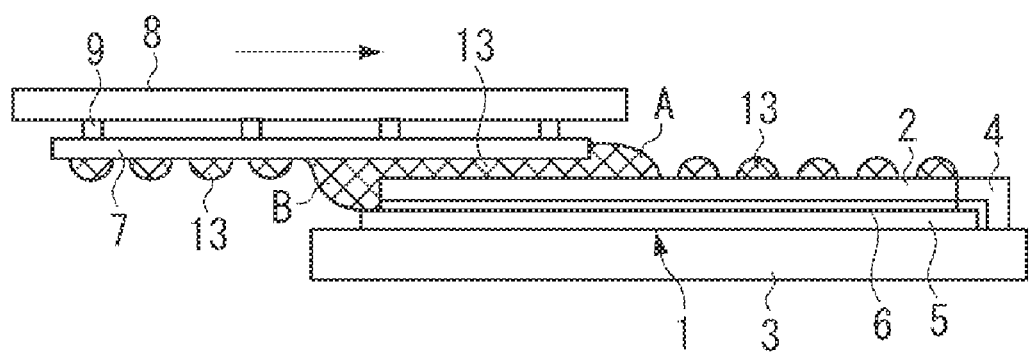

Although the adhesive 13 can be supplied, as illustrated in FIG. 4B, to the adhesive reservoirs A and B by the dispenser 12, the adhesive 13 may also be, as illustrated in FIGS. 5A and 5B, pre-coated on both the adhesion surface of the display substrate 2 and the adhesion surface of the light-transmissive substrate 7. The coating position is the region of the two adhesion surfaces other than the edges of the two adhesion surfaces that were overlapping with each other via the adhesive 13 in the second process. In the example illustrated in FIG. 5A, the adhesive 13 is thinly coated over the whole region of the two adhesion surfaces other than the edges of the two adhesion surfaces that were overlapping with each other via the adhesive 13 in the second process. In the example illustrated in FIG. 5B, the adhesive 13 is coated in dots on the region of the two adhesion surfaces other than the edges of the two adhesion surfaces that were overlapping with each other via the adhesive 13 in the second process. By thus coating the adhesive 13, the adhesive 13 can be supplied to the adhesive reservoirs A and B by a relative sliding movement of the display substrate 2 and the light-transmissive substrate 7, without using the dispenser 12 illustrated in FIG. 4B.

An exemplary embodiment using the display manufacturing method will now be described. First, a faceplate was prepared, which was formed on one face of a sheet of 700 mm×1,240 mm×2.5 mm thick soda-lime glass with a black light shielding member having a plurality of apertures in a matrix, phosphors to be positioned in each of the apertures, and an anode electrode that covers the surface of the light shielding member and the phosphors. Further, a rear plate formed on one face of a sheet of soda-lime glass having the same size, with a plurality of row direction wirings and a plurality of column direction wirings, a plurality of field-emission type electron-emitting elements connected to these wirings, and a plurality of spacers were prepared. A glass frame was attached to the periphery of the above face of the rear plate, and a frit glass was arranged on this frame. Under a vacuum atmosphere of $10^{-6}$ Pa, the rear plate and the face plate, were held so that the phosphors and the electron-emitting elements face each other. In this state, the frit glass was heated and melted so as to bond the face plate and the frame, thereby producing an 8.0 mm-thick panel-shaped display body 1.

Next, a light-transmissive resin film (antistatic film) for charge suppression was pasted on an outer surface of the display surface of the display body 1. This antistatic film is a polyester resin (PET) film having a PET coating layer in which Indium Tin Oxide (ITO) particles are dispersed. The size of this antistatic film is roughly the same as the display substrate 2 forming the display surface of the display body 1. The antistatic film was pasted on the display surface side of the display body 1 with an acrylic adhesive. In the present exemplary embodiment, the display substrate 2 is formed from the soda-lime glass that forms the face plate and the light-transmissive resin film for charge suppression. The outer surface (adhesion surface) of the display substrate 2 is the PET coating layer in which ITO particles are dispersed.

Further, a sheet of soda-lime glass having the same size as the display substrate 2 of the display body 1 was prepared, and a light-transmissive resin film for light reflection suppression was pasted on one face of this soda-lime glass. This light-transmissive resin film has, on a PET film surface, an acrylic resin layer in which silica fine particles are dispersed. The size of this light-transmissive resin film is roughly the same as the pasted soda-lime glass. This PET film was pasted on one face of the soda-lime glass with an acrylic adhesive. In the present exemplary embodiment, the light-transmissive substrate 7 is formed from the sheet of soda-lime glass and the light-transmissive resin film for light reflection suppression. The adhesion surface of the light-transmissive substrate 7 is the above-described glass surface.

Based on the processes illustrated in FIGS. 1A, 1B, 1C, and 1D, FIGS. 3A and 3B, and FIGS. 4A, 4B, 4C, and 4D, the above-described light-transmissive substrate 7 was pasted on the above-described electron beam display panel display body 1.

The antistatic film forming the outer surface of the display substrate 2 of the display body 1 was washed with an organic solvent such as alcohol or acetone. Then, as illustrated in FIG. 3A, the adhesive 13 was coated near the edge of this adhesion surface. Used as the adhesive 13 was an acrylic UV-curable adhesive having a viscosity of 800 mPa·s formed with the following composition. As illustrated in FIG. 3A, the adhesive 13 was coated so as to accumulate near one of the short sides of the display substrate 2.

Table 1 below lists adhesive components and the mass percentage contents of each listed adhesive component.

TABLE 1

| Adhesive Component | Content |
| --- | --- |
| Hydroxyethyl acrylate | 30 mass % |
| Pentaerythritol acrylate | 25 mass % |
| Acryloligomer ("EBECRYL 745" manufactured by Daicel SciTech Co., Ltd.) | 40 mass % |
| 1-Hydroxycyclohexylphenyl ketone | 5 mass % |

Next, as illustrated in FIG. 4A, the holding unit 8, to which the light-transmissive substrate 7 is attached on a lower side, was moved above the display body 1 held on the pasting base 3. The holding unit 8 (light-transmissive substrate 7) was then moved to a position where only the edge on the adhesion surface of the display substrate 2, on which the adhesive 13 is coated, and the edge on the adhesion surface of the light-transmissive substrate 7 overlap with each other in the vertical direction. The adhesion surface of the display substrate 2 and the adhesion surface of the light-transmissive substrate 7 were arranged in parallel, with a gap of 20 mm between the edge on the adhesion surface of the display substrate 2 and the edge on the adhesion surface of the light-transmissive substrate 7 overlapping in the opposing direction. From this state, the light-transmissive substrate 7 side was lowered at an approaching rate of 10 mm/min while detecting with the laser displacement sensors 10 illustrated in FIG. 1C, so that the distance between the adhesion surface of the display substrate 2 and the adhesion surface of the light-transmissive substrate 7 reached 0.3 mm.

By making the light-transmissive substrate 7 approach the display substrate 2 of the display body 1 up to a set distance, the pre-coated adhesive 13 spreads out between the edges of the adhesion surfaces of the display substrate 2 and the light-transmissive substrate 7. In the present example, 50 g of adhesive 13 was pre-coated. Further, the overlap width between the edge on the adhesion surface of the display substrate 2 and the edge on the adhesion surface of the light-transmissive substrate 7 was 20 mm. Based on these conditions, and based on the gap set 0.3 mm between the edges of the two adhesion surfaces after the light-transmissive substrate 7 side was lowered, if the specific gravity of the adhesive 13 is 1, the amount of adhesive 13 sandwiched between the edges of the two adhesion surfaces was about 3 g, and the excess portion formed the adhesive reservoirs A and B.

Next, as illustrated in FIG. 4B, the light-transmissive substrate 7 was slid in a direction parallel to the adhesion surface of the display substrate 2 while maintaining a fixed gap between the display substrate 2 and the light-transmissive substrate 7. During this sliding movement, the adhesive 13 was supplied by the dispenser 12 to the adhesive reservoirs A and B so that the adhesive 13 continuously formed adhesive reservoirs A and B. Finally, as illustrated in FIG. 4D, the light-transmissive substrate 7 was moved to a position where the light-transmissive substrate 7 completely overlapped with the display substrate 2 of the display body 1. In the present example, the sliding rate of the light-transmissive substrate 7 was set at 10 mm/sec. Based on this condition, the reaction force produced by the viscosity of the adhesive 13 was at maximum about 12.7 N. The light-transmissive substrate 7 movement was completed in about 100 seconds.

Subsequently, 30 W/cm$^2$ UV rays having a peak wavelength of 350 nm were irradiated for 4 minutes from the light-transmissive substrate 7 side to cure the adhesive 13, so that the pasting process of the light-transmissive substrate 7 onto the display substrate 2 of the display body 1 was finished. In the present example, destruction of the panel internal structure did not occur. Further, the adhesion layer obtained after adhesion was completed was found to be free of air bubbles having a size of 10 μm or more. The thickness of the adhesion layer was within ±0.05 mm of 0.3 mm.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-001709 filed Jan. 7, 2010, which is hereby incorporated by reference herein in its entirety.

What is claimed is:

1. A method for manufacturing a display comprising a light-transmissive substrate adhering to a display substrate that forms a display surface side of a display body, the method comprising:
 coating an edge of at least either an adhesion surface of the display substrate or an adhesion surface of the light-transmissive substrate with an adhesive;
 positioning the display substrate and the light-transmissive substrate in an offset manner so that an edge of each of two adhesion surfaces overlap with each other via the adhesive, and other regions of the two adhesion surfaces do not overlap with each other in an opposing direction; and
 relatively moving the display substrate and the light-transmissive substrate to a position where an edge of the display substrate and an edge of the light-transmissive substrate respectively overlap with another edge of the light-transmissive substrate and another edge of the display substrate, in a state in which an adhesive reservoir is formed along entire lengths of a corner portion formed by a side edge face on an edge side of the display substrate overlapping with the light-transmissive substrate and the adhesion surface of the light-transmissive substrate, and a corner portion formed by a side edge face on an edge side of the light-transmissive substrate overlapping with the display substrate, and the adhesion surface of the display substrate, respectively, while maintaining a fixed gap between the two adhesion surfaces.

2. The method for manufacturing a display according to claim 1, wherein, during the relative movement, the adhesive reservoirs are maintained by supplying adhesive to the adhesive reservoirs formed on the corner portion formed by a side edge face on an edge side of the display substrate overlapping with the light-transmissive substrate and the adhesion surface of the light-transmissive substrate, and the corner portion formed by a side edge face on an edge side of the light-transmissive substrate overlapping with the display substrate, and the adhesion surface of the display substrate, respectively.

3. The method for manufacturing a display according to claim 2, wherein supplying the adhesive to the adhesive reservoirs is performed by directly sending the adhesive to both adhesive reservoirs from a dispenser.

4. The method for manufacturing a display according to claim 2, wherein supplying the adhesive to the adhesive reservoirs is performed by pre-coating the adhesive on a region of the two adhesion surfaces other than the edges of the adhesion surfaces which are overlapping with each other via the adhesive.

\* \* \* \* \*